United States Patent
Reuter et al.

[15] 3,687,227
[45] Aug. 29, 1972

[54] CONTROL CIRCUIT AND LOCK VALVE FOR PIVOT AXLE LOCKOUT CYLINDERS

[72] Inventors: Gottfried Reuter; Fortunato S. Ajero, both of South Milwaukee, Wis.

[73] Assignee: Bucyrus-Erie Company, South Milwaukee, Wis.

[22] Filed: Nov. 5, 1970

[21] Appl. No.: 87,023

[52] U.S. Cl. ................. 180/1 R, 180/71, 280/112 R
[51] Int. Cl. .............................................. B60g 19/10
[58] Field of Search....280/41, 104.5 A, 6 H; 180/41, 180/66, 1; 212/145; 214/131, 138

[56] References Cited

UNITED STATES PATENTS 3,191,954    6/1965    Schuetz ..................... 280/6 H
3,300,232    1/1967    Van Winsen et al...280/112 R Primary Examiner—Philip Arnold
Attorney—Allan W. Leiser, Arthur H. Seidel and John Adams Thierry

[57] ABSTRACT

A control circuit for the lockout cylinders of a pivot axle excavator carrier includes a normally closed lock valve that is automatically actuated during propelling to establish open communication between the cylinders to allow pivotal axle movement. The valve includes facing check valves which are unseated by oppositely moving shuttle spools to open a bypass passage, and an actuating line for the valve is connected to a hydraulic propel motor so that the valve is opened automatically upon propelling. In the preferred embodiment, a second actuating line for the valve is connected to a hydraulic outrigger cylinder so that the valve is also actuated automatically while outriggers are being set.

6 Claims, 3 Drawing Figures

INVENTORS
GOTTFRIED REUTER
FORTUNATO S. AJERO

ATTORNEY

CONTROL CIRCUIT AND LOCK VALVE FOR PIVOT AXLE LOCKOUT CYLINDERS

BACKGROUND OF THE INVENTION

This invention relates to a control circuit and lock valve for the lockout cylinders of a pivot axle on an excavator carrier or the like. It is common to have pivotal axles on excavator carriers to compensate for uneven ground conditions encountered during travel. The pivotal axle is usually centrally pivoted, and there are single acting hydraulic lockout cylinders between the ends of the axle and the carrier frame to lock the axle in place during working. The control circuit for the cylinders includes a line between the cylinder ends which, when open, allows free fluid communication between the cylinders so that the axle can pivot; and some means is provided to close off the line when the axle is to be locked in place.

Prior systems of this type have not been fully satisfactory, primarily because the lockout cylinders are not automatically controlled. In some cases, for example, a manually operated lock valve is used, which requires that the operator remember to shift the valve. Also, since the operator is seated in the upper works, long control lines leading to the valve are necessary.

In at least one other prior art construction, a lock valve is set automatically upon setting of the parking brakes for the carrier. Such parking brakes are, however, usually put on the wheels of a rigid rear axle and when outriggers are used at the rear of the carrier, which is often the case, they serve no real braking function. In such cases, the parking brakes serve as nothing more than manually operable means to control the lockout cylinders, again resulting in a non-automatic operation.

Further, prior art control circuits and valves generally form independent hydraulic systems requiring a separate reservoir which must be maintained and kept filled.

SUMMARY OF THE INVENTION

This invention contemplates a fully automatic control circuit for lockout cylinders in which the lock valve is actuated automatically in response to activation of a propel motor. It also includes a novel, highly effective lock valve construction. Further, in the preferred embodiment there is a second actuating line for the lock valve so that it also opens automatically while outriggers are being set.

The general object of the invention is to provide an automatic control circuit and valve, as indicated above, which are highly effective, durable and relatively simple and inexpensive to manufacture and maintain. Other objects and advantages will appear from the description to follow.

DESCRIPTION OF THE PREFERRED EMBODIMENT

Figure 1:
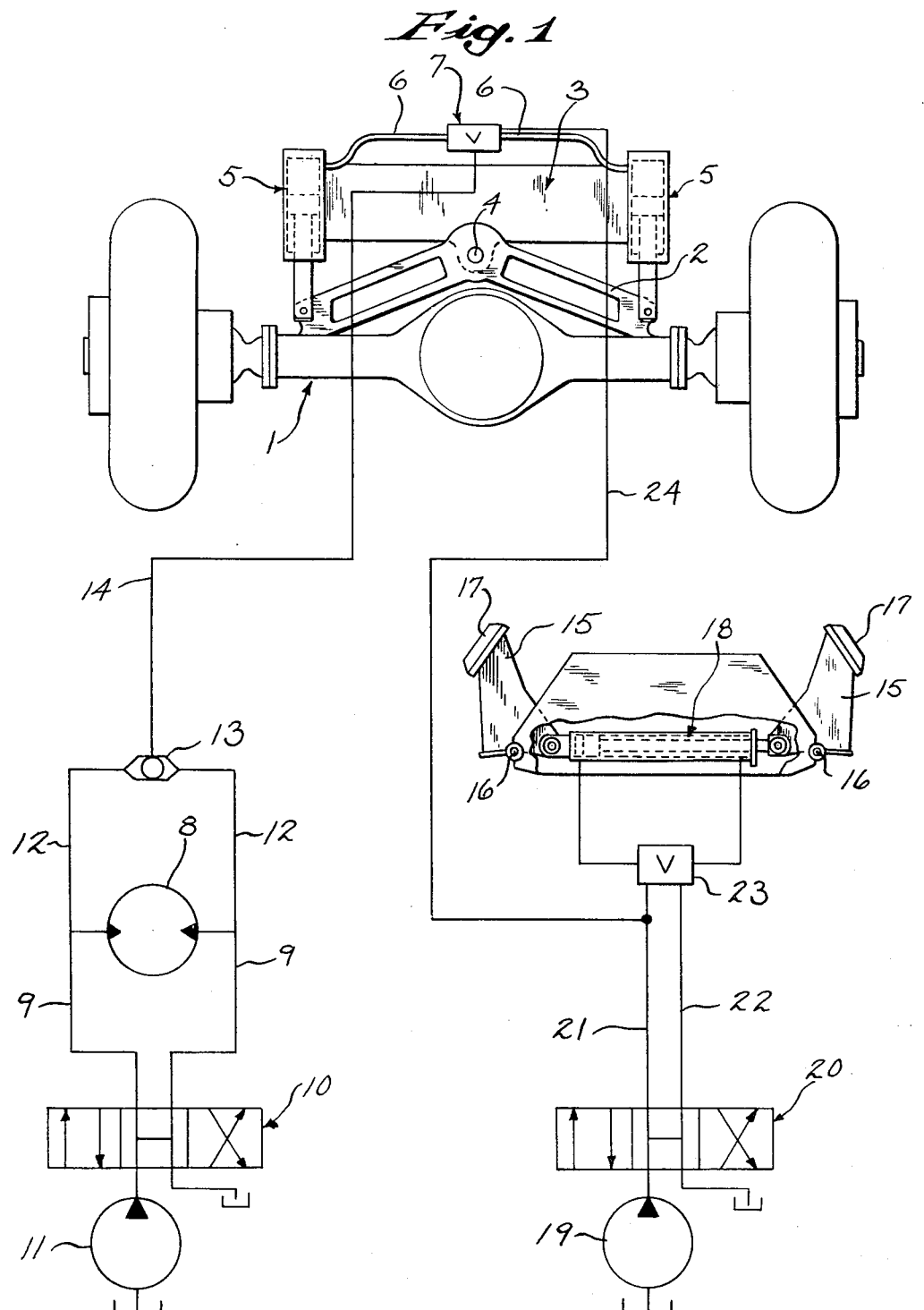
FIG. 1 is a schematic representation showing the pivot axle and outrigger assemblies of an excavator carrier and a lockout cylinder control circuit constituting a preferred embodiment of the invention.

Referring first to FIG. 1, the reference numeral 1 designates a conventional wheeled axle for a carrier. An inverted V-shaped walking beam 2 has its ends fixed to the axle 1, and the carrier frame 3 is pivotally mounted on the beam 2 by means of a central pivot pin 4. Thus, the frame 3 is capable of pivoting in either clockwise or counterclockwise fashion as seen in FIG. 1.

A pair of single acting hydraulic lockout cylinders 5 are fixed to and extend between the sides of the frame 3 and the ends of the walking beam 2, and a connecting line 6 extends between the cylinder ends of the cylinder 5. When the line 6 is open, there is free fluid communication between the cylinder ends of the two cylinders 5, which allows relative pivotal movement between the axle 1 and frame 3. A normally closed lock valve 7, to be described in detail hereafter, is interposed in the line 6 and normally prevents fluid communication between the cylinders 5 to maintain the axle 1 in a locked position. The valve 7 can, however, be actuated to open the line 6 as will be described.

The general arrangement as thus far described is conventional, and it will be understood by those skilled in the art that suitable upper works, such as a revolving excavator frame, will be mounted on the frame 3. The axle 1 can be either the front or rear axle of the carrier. The carrier of which the axle 1 forms a part can be a single, self-propelled vehicle or can include a trailer for the excavator itself and a separate pulling vehicle, and in the latter event the propel motor referred to below would be in the pulling vehicle while the pivot axle would be on the trailer. The invention is not necessarily restricted to use with excavators, and the same arrangement could be used wherever it is desired to have a pivotal axle controlled automatically by a propel motor of some sort.

A reversible hydraulic propel motor 8, which can either be located in the carrier of which the axle 1 forms a part or in a separate pulling vehicle, is connected by opposite lines 9 to a directional control valve 10 and a propel pump 11, and serves to drive the carrier, all in conventional fashion. According to the present invention, however, there is a special actuating circuit interposed between the motor 8 and the lock valve 7. This includes hydraulic takeoff lines 12 leading from opposite sides of the propel motor 8 to a shuttle valve 13, and an actuating line 14 leading to the lock valve 7. The shuttle valve 13 may be of any known type, and pressure in either of the lines 12 will of course cause the shuttle valve 13 to open and result in pressure in the line 14 to actuate the valve 7 as will be described.

In the preferred embodiment shown, the axle 1 is the front axle of a carrier, and there is an outrigger assembly at the rear axle, which assembly is also seen in FIG. 1. The outrigger assembly includes a pair of outrigger arms 15 pivotally mounted at points 16 on opposite sides of the same frame 3 and provided with ground engaging pads 17. A double acting hydraulic operating cylinder 18 has its ends pinned to respective outrigger arms 15. As seen in FIG. 1, the cylinder 18 is retracted and the arms 15 are in a raised, inoperative position. Upon extension of the cylinder 18, the arms 15 will be pivoted outwardly away from one another and downwardly until the pads 17 engage the ground and further extension will then cause the machine to be raised to a working position.

The cylinder 18 is operated by an outrigger pump 19 through a directional control valve 20 and operating lines 21 and 22 which lead, respectively, to the cylinder and rod ends of the cylinder 18. A conventional holding valve 23 is interposed in the lines 21 and 22 so that the cylinder 18 can be locked in position as desired.

A second operating line 24 leads from the outrigger cylinder line 21 to the lock valve 7. The cylinder line 21 is pressurized when the outriggers are to be set, and this pressurizes the line 24 to actuate the valve 7 as will be described. The line 21 is at approximately tank pressure when the outriggers have been raised and the machine is to be propelled, and the line 24 then also provides an exhaust function upon actuation of the valve 7 in response to the propel motor 8 as will be discussed below.

The single cylinder, pivotal outrigger assembly shown is preferred, but it will be appreciated that the control circuit of the invention would be equally efficient with other single or double cylinder outrigger arrangements. As will become apparent, it is necessary only that there be one or more hydraulic operating cylinders for the outriggers and that the line 24 lead from the valve 7 to a line which is pressurized when the outriggers are being set and at tank pressure when they are retracted. The invention is also applicable to carriers without outriggers, and in this event the line 24 could lead to a reservoir.

Figure 2:
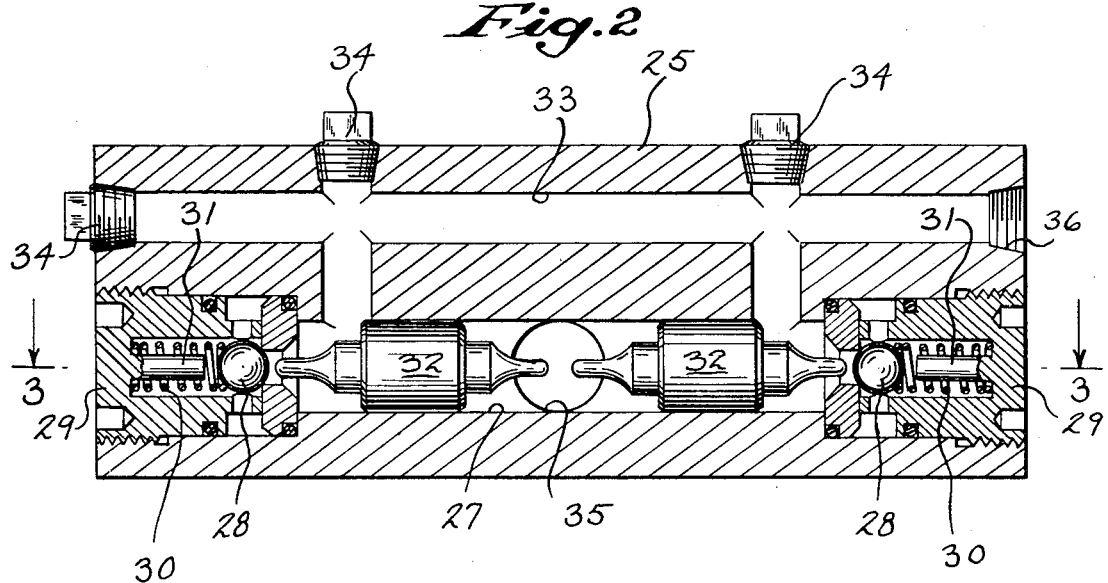
FIG. 2 is a view in cross section, through the plane 2—2 shown in FIG. 3, of the lock valve of the circuit of FIG. 1.
Figure 3:
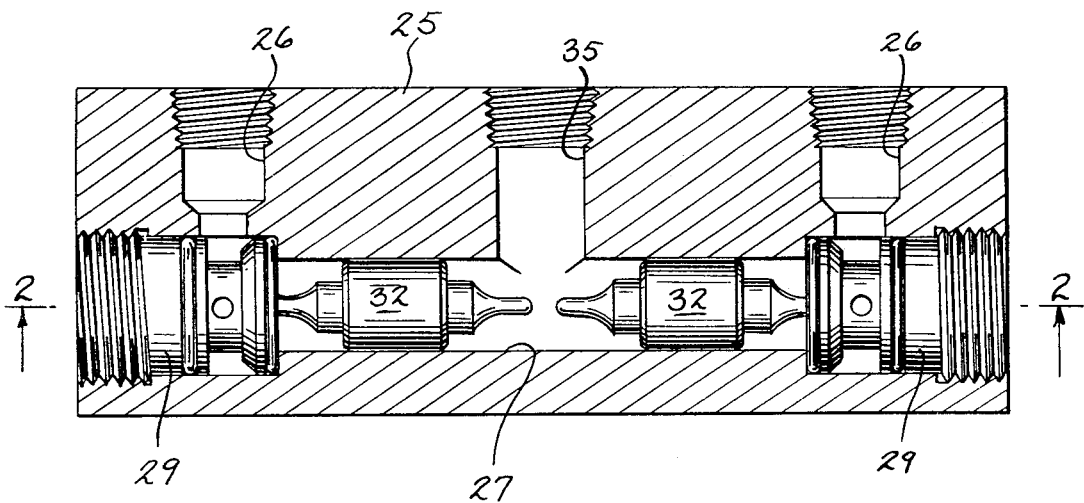
FIG. 3 is a view in cross section of the lock valve through the plane 3—3 shown in FIG. 2.

The lock valve 7 is shown clearly in FIGS. 2 and 3. It includes an elongated body 25 provided at opposite ends with working inlet passages 26 which are externally connected to respective portions of the connecting line 6 between the cylinders 5 and which are perpendicular to and lead to respective ends of a spool bore 27. Ball check valves 28 are disposed on the entry sides of the passages 26 and normally close the same to prevent incoming flow, and thus prevent fluid flow through the valve 7 and between the cylinders 5. The balls 28 are preferably held in ported cages 29 threaded into the valve body 25 and springs 30 normally hold the balls 28 in seated positions. Stops 31 in the cages 29 limit rearward movement of the balls 28.

The two balls 28 face one another and are at opposite ends of an aligned with the spool bore 27. A pair of shuttle spools 32 are reciprocably slidable in the bore 27, each spool 32 having a central cylindrical body portion with a sealing fit in the bore 27 and opposite reduced ends, the outer ends of each spool 32 being adapted to engage and unseat respective balls 28. A generally U-shaped bypass passage 33 leads from one end of the spool bore 27 to the other to bypass the same. The ends of the passage 33 face the balls 28 and are in communication with the inlet passages 26, the passage 33 thus serving to allow fluid to flow between the inlet passages 26 when the balls 28 have been unseated. The bypass passage 33 is conveniently, but not necessarily, formed by drilling a through bore parallel to the bore 27 and two cross bores as shown and then closing the open ends with threaded plugs 34 except for one opening for a purpose to be described.

An actuating inlet 35 leads to the center of the spool bore 27 between the shuttle spools 32, and it is this inlet that the actuating line 14 is connected to. The end of one of the bores forming the bypass passage 33 is left open to form a second actuating inlet 36 leading from the passage 33, and it is this inlet that the line 24 is connected.

In FIGS. 2 and 3, the valve 7 is shown in its normally closed position, which it automatically assumes when neither the propel motor 8 nor the outrigger cylinder 18 has been activated. In this position, both balls 28 are seated by their springs 30 and there is no fluid communication between the cylinders 5 so that the axle 1 is locked in position. The shuttle spools 32 are in the bore 27 and their inner ends are engageable with each other, the length of the spools 32 being such that neither can move past the port 35.

When it is desired to propel the machine, the operator will actuate the propel motor 8 through the control valve 10, and immediately upon such activation the line 14 will be pressurized. This pressure will be reflected in the spool bore 27 between the spools 32 and they will be moved outwardly away from each other. The small amount of fluid displaced by this movement can exit through the bypass passage 33 and line 24 to the line 21, which is then approximately at tank pressure. As the spools 32 move outwardly, their outer ends come into engagement with and unseat the balls 28. Fluid can then flow into or out of either inlet passage 26 and through the bypass passage 33, the relatively small diameters of the outer ends of the spools 32 allowing such flow. As a result, free fluid communication is established between the cylinders 5 thus allowing the axle 1 to pivot. As soon as propelling stops, the pressure in the bore 27 between the spools 32 will be reduced, and the springs 30 will seat the balls 28 to close off further communication. As a result, the axle 1 will automatically be locked in its then current position.

It is also desirable to have the axle 1 pivotal as the outrigger arms 15 are being set to accommodate for uneven ground. Since propelling has then been stopped, however, the valve 7 would normally be in a closed position which would not allow such pivotal movement. The line 24, however, serves as a second actuating line for the valve 7 to open it while the outriggers are being set. When the outriggers are to be set, the valve 20 is actuated, and this pressurizes the cylinder line 21 and also pressurizes the actuating line 24, this pressure being reflected in the bypass passage 33. Because of the reduced diameter of the outer ends of the spools 32, pressurized fluid in the passage 33 acts directly against the balls 28 to unseat them and reestablish communication between the cylinders 5. The shuttle spools 32 are moved inwardly as the result of this pressure, and the small amount of fluid displaced by this movement is fed back through the line 14 to the propel motor 8, which is then approximately at tank pressure. When the cylinder 18 has been fully extended, the holding valve 23 is set and the control valve 20 is moved back to center position. As a result, that portion of the line 21 to which the line 24 is connected is at tank pressure and the springs 30 are free to reseat the balls 28 to lock the axle 1 in position.

The valve and circuit shown provide an extremely effective yet relatively simple and inexpensive means for fully automatic control of a pivoting axle in response to the initiation of propelling and/or the setting of outriggers. Although a preferred embodiment of the invention has been shown and described, it will be apparent that modifications might be made without departure from the spirit of the invention. As indicated, the invention has numerous applications, and can be used with different types of axle and outrigger assemblies. While the fully hydraulic system shown is preferred, mechanical or electrical equivalents might be substituted. While the valve 7 is highly desirable, other forms of normally closed, hydraulically actuable valves could be used to provide automatic operation. Connecting the line 24 to the line 21 is advantageous when outrigger actuation is desired, and is also convenient since both the valve 7 and outrigger assembly are in the lower works, but the line 24 could as previously indicated simply lead to a reservoir. In view of the possible modifications, the invention is not intended to be limited except insofar as specifically required by the following claims.

We claim:

1. A control circuit for an excavator carrier or the like having a propel motor, and a pivot axle with hydraulic lockout cylinders at each end,
    said control circuit comprising: a connecting line between the lockout cylinders which, when open, allows fluid communication therebetween to allow pivotal movement of the axle; a normally closed lock valve in the connecting line which is actuable to open the connecting line; and actuating circuit means between the propel motor and the lock valve to automatically actuate the lock valve upon activation of the propel motor, the lock valve automatically returning to closed position when the propel motor is no longer activated.

2. The combination of claim 1 wherein the vehicle is also provided with outrigger means and operating means therefor; and there is a second actuating circuit means between the outrigger operating means and the lock valve to actuate the lock valve automatically on activation of the outrigger operating means.

3. The combination of claim 1 wherein the propel motor is a hydraulic motor; and the lock valve is hydraulically actuable and the actuating circuit includes a hydraulic line leading from the propel motor to the lock valve which is pressurized whenever the propel motor is activated.

4. The combination of claim 3 wherein the carrier is provided with extendable outrigger means and operating means therefor; and the outrigger operating means includes a hydraulic cylinder; and there is a second actuating circuit for the lock valve which comprises a hydraulic line leading from the lock valve and communicating with that end of the outrigger operating cylinder which is pressurized when the outrigger means is being extended.

5. The combination of claim 3 wherein the lock valve includes opposite inlet passages connected to respective parts of the line leading between the lockout cylinders; facing check valves of the entry sides of the inlet passages which are spring biased to normally close the same; a spool bore in alignment with the check valves; a pair of shuttle spools in the spool bore which are adapted to be moved away from one another to engage and unseat respective check valves; an actuating inlet leading to the spool bore between the shuttle spools; and a bypass passage the ends of which face respective check valves and are adapted to communicate with respective inlet passages and which bypasses the spool bore so that fluid can flow in either direction through the valve when the check valves are unseated.

6. The combination of claim 4 wherein the lock valve includes opposite inlet passages connected to respective parts of the line leading between the lockout cylinders; facing check valves of the entry sides of the inlet passages which are spring biased to normally close the same; a spool bore in alignment with the check valves; a pair of shuttle spools in the spool bore which are adapted to be moved away from one another to engate and unseat respective check valves; an actuating inlet leading to the spool bore between the shuttle spools; a bypass passage the ends of which face respective check valves and are adapted to communicate with respective inlet passages and which bypasses the spool bore so that fluid can flow in either direction through the valve when the check valves are unseated; and the hydraulic line of the second actuating circuit leads to the bypass passage so that pressure therein can act directly on the check valves.

* * * * *

UNITED STATES PATENT OFFICE
CERTIFICATE OF CORRECTION

PO-1050
(5/69)

Patent No. 3,687,227      Dated August 29, 1972

Inventor(s) Gottfried Reuter and Fortunato S. Ajero

It is certified that error appears in the above-identified patent and that said Letters Patent are hereby corrected as shown below:

Column 3, line 48, "an" should read -- and --

Column 4, line 4, -- to -- should be inserted immediately before the period

Column 6, line 33, "engate" should read -- engage --

Signed and sealed this 9th day of January 1973.

(SEAL)
Attest:

EDWARD M. FLETCHER, JR.
Attesting Officer

ROBERT GOTTSCHALK
Commissioner of Patents